United States Patent
Kitajima et al.

(10) Patent No.: US 9,364,784 B2
(45) Date of Patent: Jun. 14, 2016

(54) EMISSION GAS TREATMENT METHOD AND EMISSION GAS TREATMENT APPARATUS

(71) Applicant: Nippon Electric Glass Co., Ltd., Shiga (JP)

(72) Inventors: Kenji Kitajima, Shiga (JP); Tatsuya Takaya, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/382,421

(22) PCT Filed: Feb. 19, 2013

(86) PCT No.: PCT/JP2013/053969
§ 371 (c)(1),
(2) Date: Sep. 2, 2014

(87) PCT Pub. No.: WO2013/133003
PCT Pub. Date: Sep. 12, 2013

(65) Prior Publication Data
US 2015/0101484 A1   Apr. 16, 2015

(30) Foreign Application Priority Data
Mar. 5, 2012 (JP) ................. 2012-048008

(51) Int. Cl.
B01D 53/14 (2006.01)
B01D 47/06 (2006.01)
(Continued)

(52) U.S. Cl.
CPC ............ *B01D 53/1418* (2013.01); *B01D 36/00* (2013.01); *B01D 47/06* (2013.01); *B01D 53/1425* (2013.01); *B03C 3/017* (2013.01);
(Continued)

(58) Field of Classification Search
None
See application file for complete search history.

(56) References Cited

U.S. PATENT DOCUMENTS

2008/0206120 A1   8/2008   Grochowski
2014/0075995 A1   3/2014   Ando et al.

FOREIGN PATENT DOCUMENTS

CN   101119787   2/2008
CN   101888980   11/2010
(Continued)

OTHER PUBLICATIONS

International Search Report issued May 14, 2013 in International (PCT) Application No. PCT/JP2013/053969.
(Continued)

*Primary Examiner* — Duane Smith
*Assistant Examiner* — Phillip Shao
(74) *Attorney, Agent, or Firm* — Wenderoth, Lind & Ponack, L.L.P.

(57) ABSTRACT

An emission gas treatment apparatus recovers a recycle feed containing boron from emission gas discharged by a glass melting furnace. The apparatus includes a collection device for collecting a component containing boron from the emission gas by a wet process to obtain a collected liquid, a first filter for separating the collected liquid into a solid and a liquid, and an ion-exchange resin for forming a boron solution by removing an impurity from an extracted liquid obtained in the first filter. The apparatus also includes a mixing tank for mixing an extracted solid obtained in the first filter in the boron solution to form an extracted solid-containing solution, a second filter for separating the extracted solid-containing solution into a solid and a liquid, and a vacuum dryer for recovering the recycle feed from an extracted solid obtained in the second filter.

6 Claims, 3 Drawing Sheets

(51) Int. Cl.
  *B03C 3/017* (2006.01)
  *B03C 3/16* (2006.01)
  *F23J 15/02* (2006.01)
  *B01D 36/00* (2006.01)
  *C03B 5/16* (2006.01)
  *C03C 1/00* (2006.01)
  *B01D 53/46* (2006.01)
  *C02F 1/42* (2006.01)
  *C02F 103/18* (2006.01)

(52) U.S. Cl.
  CPC ... *B03C 3/16* (2013.01); *C03B 5/16* (2013.01); *C03C 1/002* (2013.01); *F23J 15/02* (2013.01); *B01D 53/46* (2013.01); *B01D 2252/103* (2013.01); *B01D 2258/0241* (2013.01); *C02F 1/42* (2013.01); *C02F 2103/18* (2013.01); *F23J 2217/102* (2013.01); *F23J 2219/40* (2013.01)

(56) References Cited

FOREIGN PATENT DOCUMENTS

| | | |
|---|---|---|
| CN | 102247752 | 11/2011 |
| JP | 62-171731 | 7/1987 |
| JP | 2001-317726 | 11/2001 |
| JP | 2003-305331 | 10/2003 |
| JP | 2004-238236 | 8/2004 |
| WO | 2012/161274 | 11/2012 |

OTHER PUBLICATIONS

Chinese Office Action issued Oct. 10, 2015 in corresponding Chinese Patent Application No. 201380008480.X with English Translation.
International Preliminary Report on Patentability and Written Opinion of the International Searching Authority issued Sep. 9, 2014 in International (PCT) Application No. PCT/JP2013/053969.

FIG. 3 the recovery of a recycle feed in the emission gas is repeated, the concentration of the hydrosulfate and the halide in the recycle feed increases, which may serve as a factor for having an adverse effect on the quality of glass.

EMISSION GAS TREATMENT METHOD AND EMISSION GAS TREATMENT APPARATUS

TECHNICAL FIELD

The present invention relates to a technology for recovering a recycle feed from emission gas discharged by a glass melting furnace for melting a glass raw material.

BACKGROUND ART

In a glass melting furnace, molten glass is produced by heating a glass raw material in a powder or particle form with a burner flame or the like. This molten glass is formed into various glass products through predetermined forming steps such as pressing and blowing.

In this case, emission gas generated from the glass melting furnace contains a part of components of the glass raw material in a gaseous or small-sized solid form. Therefore, the emission gas also contains a great amount of components which can be recycled as a glass raw material. Thus, the recovery of a recycle feed from the emission gas can also contribute to saving of a glass raw material. Further, environment can be simultaneously taken into consideration.

However, when an attempt is made to recover a recycle feed from the emission gas, the recycle feed contains a great amount of components which has an adverse effect on the quality of glass due to fuel for a burner flame and impurities contained in the glass raw material. Therefore, it is actually difficult to use a recycle feed recovered from emission gas as a glass raw material. Herein, as the impurities which have an adverse effect on the quality of glass, for example, there are given a hydrosulfate and a halide, and the hydrosulfate causes the generation of air bubbles in glass.

For example, in Patent Literature 1, there is disclosed a method of reducing a sulfur oxide which causes air bubbles from the emission gas and recovering a recycle feed which can be utilized as a glass raw material by using fuel not substantially containing a sulfur component as fuel for a burner flame and using a material whose content of a sulfur component is also small correspondingly as a glass raw material.

CITATION LIST

Patent Literature 1: JP 2004-238236 A

SUMMARY OF INVENTION

Technical Problem

In the case of borosilicate glass, when a glass raw material is melted in a glass melting furnace, emission gas contains boron. Therefore, when boron can be recovered as a recycle feed from the emission gas, the recycle feed can be used as a glass raw material with good quality.

However, when an attempt is made to recover boron from the emission gas by the method described in Patent Literature 1, the following problem may occur. Specifically, even when fuel, a glass raw material, or the like whose content of impurities is small is used, a hydrosulfate and a halide being impurity components of the fuel, the glass raw material, or the like cannot be removed completely. Therefore, the hydrosulfate and the halide are recovered simultaneously to some degree as a recycle feed, and boron cannot be recovered efficiently. Further in this case, when the recovery of a recycle feed in the emission gas is repeated, the concentration of the hydrosulfate and the halide in the recycle feed increases, which may serve as a factor for having an adverse effect on the quality of glass.

It is a technical object of the present invention to recover boron efficiently from emission gas discharged by a glass melting furnace for melting a boron-containing glass raw material.

Solution to Problem

According to a first invention devised to achieve the above-mentioned object, there is provided a emission gas treatment method for recovering a recycle feed containing boron from emission gas discharged by a glass melting furnace for melting a boron-containing glass raw material, the emission gas treatment method comprising: a collection step of obtaining a collected liquid by collecting a component containing boron from the emission gas by a wet process; a first separation step of separating the collected liquid into a solid and a liquid; a solution formation step of obtaining a boron solution by removing an impurity from an extracted liquid obtained in the first separation step; a mixing step of obtaining an extracted solid-containing solution by mixing an extracted solid obtained in the first separation step in the boron solution; a second separation step of separating the extracted solid-containing solution into a solid and a liquid; and a recovery step of recovering the recycle feed from an extracted solid obtained in the second separation step. Note that, the term "boron" as used herein includes a boron compound such as boric acid (the same applies to the following).

According to the above-mentioned configuration, boron not substantially containing impurities such as a hydrosulfate and a halide can be recovered efficiently from the emission gas discharged by the glass melting furnace for the following reason.

The collected liquid obtained in the collection step is separated into a solid and a liquid: an extracted solid and an extracted liquid in the first separation step. Of those, the extracted liquid is formed into a boron solution with impurities removed in the solution formation step. Boron has already been dissolved in the boron solution, and the concentration of boron therein is high. Therefore, when the extracted solid and the boron solution are mixed to form an extracted solid-containing solution in the mixing step, boron in the extracted solid is difficult to be dissolved in the extracted solid-containing solution and remains as an undissolved substance. On the other hand, impurities (a hydrosulfate, a halide, etc.) other than boron in the extracted solid are soluble, and the concentration of the impurities in the boron solution is low; therefore, the impurities are dissolved easily in the extracted solid-containing solution. Thus, when the extracted solid which is the undissolved substance is taken out by separating the extracted solid-containing solution in such a dissolved state into a solid and a liquid in the second separation step, a recycle feed containing boron whose content of impurities is very small can be recovered in the recovery step.

Herein, it is also conceivable to introduce water instead of the boron solution and mix the extracted solid with water in the mixing step. However, in this case, not only the impurities in the extracted solid but also most part of boron is dissolved in the water. Therefore, even when the extracted solid-containing solution is separated into a solid and a liquid in the second separation step, most part of boron is recovered as an extracted liquid and cannot be separated smoothly from the impurities. Thus, in the mixing step, as described above, it is important to mix the extracted solid with the boron solution so as to have the above-mentioned actions and effects. Further, a boron solution to be purified in a system is used, and hence it is not necessary to separately introduce a boron solution from outside the system.

In the above-mentioned method, it is preferred that the solution formation step comprise removing the impurity from the extracted liquid through use of an ion-exchange resin.

With this, boron in the extracted liquid can be recovered efficiently. That is, boron is unlikely to adsorb to ions due to its weak acidity and passes through the ion-exchange resin. On the other hand, impurity components (a hydrosulfate, a halide, etc.) other than boron are likely to adsorb to ions due to their strong acidity and captured by the ion-exchange resin. Thus, when the ion-exchange resin is used, impurities in the extracted liquid can be removed efficiently while the reduction amount of boron in the extracted liquid is reduced as much as possible. As the ion-exchange resin, it is preferred to use a weakly basic anion-exchange resin from the viewpoint of preventing boron adsorption.

In the above-mentioned method, it is preferred that the first separation step and the second separation step comprise performing solid-liquid separation by filtration.

With this, the solid-liquid separation can be performed easily and efficiently.

In the above-mentioned method, the emission gas treatment method may further comprise supplying an extracted liquid obtained in the second separation step to the solution formation step. The solution formation step may comprise obtaining the boron solution by removing an impurity from the extracted liquid obtained in the first separation step and from the extracted liquid obtained in the second separation step. The recovery step may comprise recovering the recycle feed by drying the extracted solid obtained in the second separation step.

With this, the recycle feed can be recovered efficiently from a solid without wasting the extracted liquid generated in the second separation step.

In the above-mentioned method, the emission gas treatment method may further comprise: a second solution formation step of obtaining a boron solution by removing an impurity from an extracted liquid obtained in the second separation step; and a second mixing step of obtaining an extracted solid-containing solution by mixing the extracted solid obtained in the second separation step in the boron solution obtained in the second solution formation step. The recovery step may comprise recovering the recycle feed by drying the extracted solid-containing solution obtained in the second mixing step.

With this, the recycle feed can be recovered efficiently from a liquid without wasting the extracted liquid generated in the second separation step.

According to a second invention devised to achieve the above-mentioned object, there is provided a emission gas treatment method for recovering a recycle feed containing boron from emission gas discharged by a glass melting furnace for melting a boron-containing glass raw material, the emission gas treatment method comprising: a collection step of obtaining collected powder by collecting a component containing boron from the emission gas by a dry process; a mixing step of obtaining a collected powder-containing solution by mixing the collected powder in a solution; a separation step of separating the collected powder-containing solution into a solid and a liquid; a solution formation step of obtaining a boron solution by removing an impurity from an extracted liquid obtained in the separation step and supplying the boron solution as the solution in the mixing step; and a recovery step of recovering the recycle feed from an extracted solid obtained in the separation step.

According to the above-mentioned configuration, the recovery rate of boron can be enhanced efficiently while the recovery rate of impurities such as a hydrosulfate and a halide is reduced as much as possible for the following reason.

The collected powder obtained in the collection step is mixed with the solution in the mixing step to form a collected powder-containing solution. The collected powder-containing solution is separated into a solid and a liquid: an extracted solid and an extracted liquid in the separation step. Of those, the extracted liquid is formed into a boron solution with impurities removed in the solution formation step, and thereafter the boron solution is returned as the above-mentioned solution in the mixing step. Therefore, in the mixing step, the collected powder and the boron solution are mixed; however, the concentration of boron in the boron solution has already been high, and hence boron in the collected powder is unlikely to be dissolved and remains as an undissolved substance in the solution. On the other hand, impurities (a hydrosulfate, a halide, etc.) other than boron in the collected powder are dissolved easily due to the low concentration thereof in the boron solution. Thus, when the collected powder-containing solution in such a dissolved state is separated into a solid and a liquid, and an extracted solid which is the undissolved substance is taken out in the separation step, a recycle feed containing boron whose content of impurities is very small can be recovered in the recovery step.

In the above-mentioned method, the solution formation step may comprise removing the impurity from the extracted liquid through use of an ion-exchange resin. Further, the separation step may comprise performing solid-liquid separation by filtration.

According to a third invention devised to achieve the above-mentioned object, there is provided a emission gas treatment apparatus for recovering a recycle feed containing boron from emission gas discharged by a glass melting furnace for melting a boron-containing glass raw material, the emission gas treatment apparatus comprising: collection means for collecting a component containing boron from the emission gas by a wet process to obtain a collected liquid; first separation means for separating the collected liquid into a solid and a liquid; solution formation means for forming a boron solution by removing an impurity from an extracted liquid obtained in the first separation means; a mixing tank for mixing an extracted solid obtained in the first separation means in the boron solution to form an extracted solid-containing solution; second separation means for separating the extracted solid-containing solution into a solid and a liquid to take out an undissolved substance in the extracted solid-containing solution; and recovery means for recovering the recycle feed from an extracted solid obtained in the second separation means.

According to the above-mentioned configuration, the action and effect similar to those of the first invention which has already been described can be exhibited.

According to a fourth invention devised to achieve the above-mentioned object, there is provided a emission gas treatment apparatus for recovering a recycle feed containing boron from emission gas discharged by a glass melting furnace for melting a boron-containing glass raw material, the emission gas treatment device comprising: collection means for collecting a component containing boron from the emission gas by a dry process to obtain collected powder; a mixing tank for mixing the collected powder in a solution to form a collected powder-containing solution; separation means for separating the collected powder-containing solution into a solid and a liquid to take out an undissolved substance in the collected powder-containing solution; solution formation means for forming a boron solution by removing an impurity from an extracted liquid obtained in the separation means and supplying the boron solution as the solution in the mixing tank; and recovery means for recovering the recycle feed from an extracted solid obtained in the separation means.

According to the above-mentioned configuration, the action and effect similar to those of the second invention which has already been described can be exhibited.

Advantageous Effects of Invention

As described above, according to one embodiment of the present invention, it is possible to recover boron whose content of impurities such as a hydrosulfate and a halide is small from the emission gas discharged by the glass melting furnace for melting the boron-containing glass raw material.

DESCRIPTION OF EMBODIMENTS

Now, embodiments of the present invention are described with reference to the attached drawings.

First Embodiment

Figure 1:
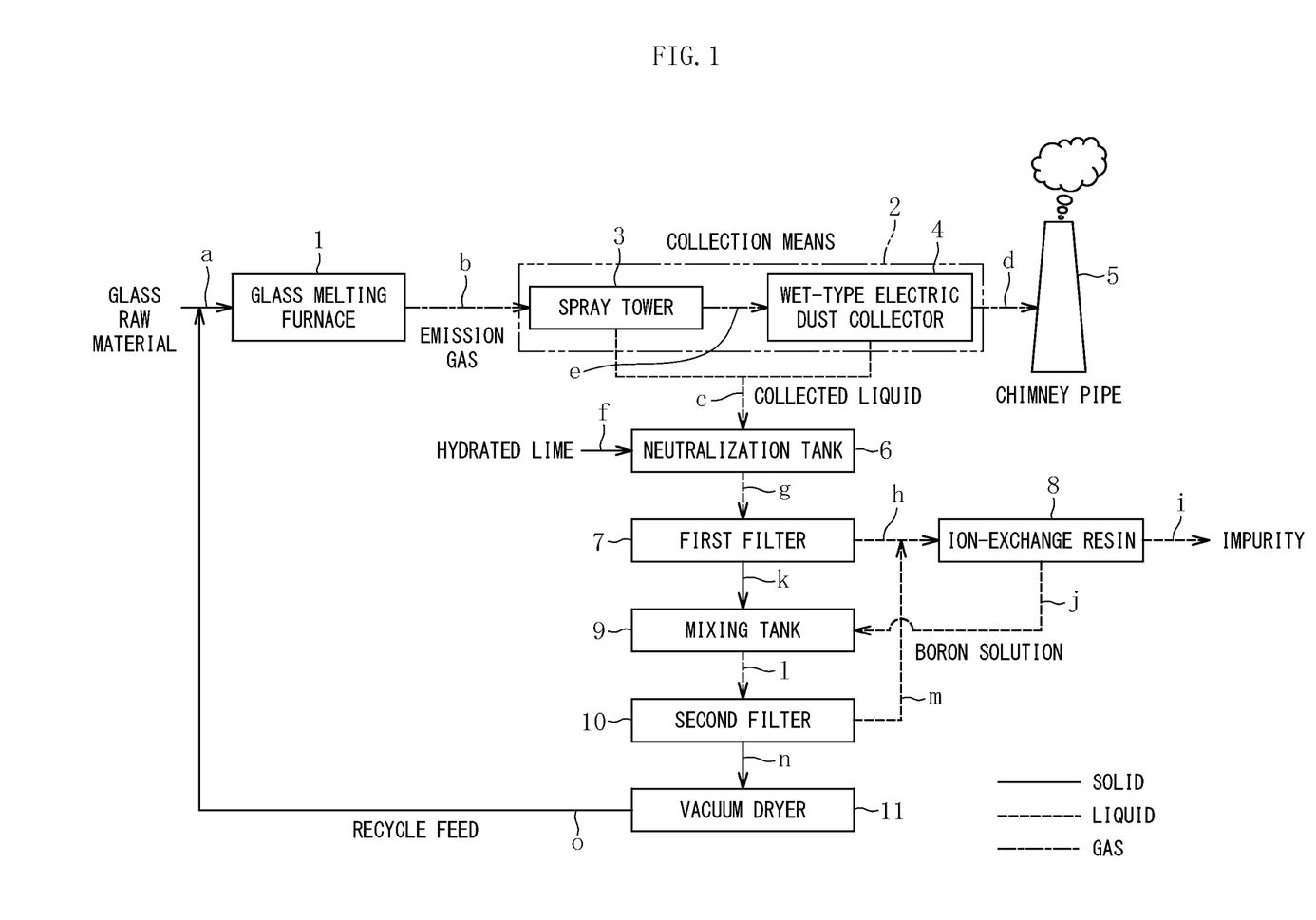
FIG. 1 is a diagram illustrating a glass melting facility in which a emission gas treatment apparatus according to a first embodiment of the present invention is incorporated.

FIG. 1 is a diagram illustrating a glass melting facility in which a emission gas treatment apparatus according to a first embodiment of the present invention is incorporated. The glass melting facility produces molten glass to be formed into borosilicate glass by heating a boron-containing glass raw material (hereinafter simply referred to as "glass raw material") "a" prepared so as to have an intended glass composition with a burner flame in a glass melting furnace 1. It is preferred to use, for example, LPG or LNG whose content of a sulfur component is small as fuel for the burner flame. Further, it is preferred to use the glass raw material "a" whose content of a sulfur component is also small.

Emission gas "b" generated from the glass melting furnace 1 contains a small-sized solid and a vaporized substance derived from the glass raw material "a" and the fuel for the burner flame. Therefore, the emission gas "b" contains a hydrosulfate and a halide derived from the impurities of the glass raw material "a" and the fuel besides boron which is a useful component.

The emission gas "b" is first introduced to collection means 2. In the collection means 2, the emission gas "b" is cooled to, for example, 60° C. to 70° C., and boron contained in a vaporized state in the emission gas "b" is crystallized out.

In this embodiment, the collection means 2 is wet-type collection means comprising a spray tower 3 and a wet-type electric dust collector 4. Note that, the collection means 2 is not particularly limited as long as it can collect a boron component from emission gas by a wet process, and for example, a scrubber may be used.

Components (a small-sized solid and a vaporized substance) containing boron contained in the emission gas "b" is collected as a collected liquid "c" by being brought into contact with water sprayed in the spray tower 3. Further, a component "e" containing boron having passed through the spray tower 3 is also collected as the collected liquid "c" by being brought into contact with water in the wet-type electric dust collector 4. The emission gas "d" purified while passing through the wet-type electric dust collector 4 is released into the atmosphere from a chimney pipe 5. Note that, the wet-type electric dust collector 4 plays an auxiliary role of the spray tower 3, and hence may be omitted.

The collected liquid "c" collected in the spray tower 3 and the wet-type electric dust collector 4 is introduced to a neutralization tank 6. In the neutralization tank 6, an alkali component such as hydrated lime "f" is added to the collected liquid "c" to neutralize the collected liquid "c" exhibiting an acidity. This prevents a tubing and the like from being corroded with an acid in subsequent steps and lowers the solubility of boron in the collected liquid "c" to enhance the recovery efficiency thereof. Note that, the neutralization tank 6 may be omitted.

Herein, the collected liquid "c" is subjected to neutralization treatment so that the concentration (pH) of hydrogen ions becomes weakly alkaline, for example, 7.5 to 12.0, more preferably 8.0 to 10.0.

A collected liquid "g" neutralized in the neutralization tank 6 is introduced to a first filter 7 serving as solid-liquid separation means. In the first filter 7, the collected liquid "g" is separated into a solid and a liquid: an extracted solid (filter cake) "k" and an extracted liquid (filtrate) "h". Note that, the extracted solid "k" contains a liquid component of about 10% to 20%, and the liquid component contains a great amount of impurities.

Examples of the first filter 7 include filter pressing, centrifugation, and vacuum filtration.

The extracted liquid "h" obtained in the first filter 7 is introduced to an ion-exchange resin 8 serving as solution formation means. The extracted liquid "h" contains a hydrosulfate, a halide, calcium, and boron. In the ion-exchange resin 8, impurities (for example, a hydrosulfate, a halide, etc.) in the extracted liquid "h" are removed. More specifically, boron (mainly, boric acid) in the extracted liquid "h" is unlikely to adsorb to ions due to its weak acidity and passes through the ion-exchange resin 8. On the other hand, impurities "i" other than boron in the extracted liquid "h" are likely to adsorb to ions due to its strong acidity. The impurities "i" are captured by the ion-exchange resin 8 and cannot pass through the ion-exchange resin 8. Thus, when the extracted liquid "h" is caused to pass through the ion-exchange resin 8, a boron solution "j" with the impurities "i" removed is formed. Note that, for example, a reverse osmosis membrane or the like may be used as the solution formation means, but an ion-exchange resin is preferably used because the recovery rate of boron is degraded when the reverse osmosis membrane or the like is used. Further, calcium can be used as a glass raw material, and hence there is no problem even when calcium is mixed in boron.

Herein, it is preferred in the boron solution "j" that boron be in a saturated state or close to a saturated state. In other words, it is preferred that the boron solution "j" be a high-concentration solution of boron. The concentration of boron in the boron solution "j" is, for example, preferably 0.1% to 0.8%, more preferably 0.3% to 0.6%.

On the other hand, the extracted solid "k" obtained in the first filter 7 is introduced to a mixing tank 9. In the mixing tank 9, the boron solution "j" formed with the ion-exchange resin 8 is also introduced, and the extracted solid "k" and the boron solution "j" are mixed in the mixing tank 9 to form an extracted solid-containing solution "l". In this case, the concentration of boron in the boron solution "j" has already been high, and hence boron in the extracted solid "k" is unlikely to be dissolved and remains as an undissolved substance in the extracted solid-containing solution "l". In contrast, the concentration of impurities in the boron solution "j" is low, and hence the impurities in the extracted solid "k" are easily dissolved in the extracted solid-containing solution "l".

The extracted solid-containing solution "l" obtained in the mixing tank 9, which exhibits such a dissolved state, is introduced to a second filter 10. In the second filter 10, the extracted solid-containing solution "l" is separated into a solid and a liquid: an extracted solid "n" and an extracted liquid "m". Note that, the extracted solid "n" contains a liquid component of about 10% to 20%, and the liquid component contains almost no impurities.

Examples of the second filter 10 include filter pressing, centrifugation, and vacuum filtration.

The extracted liquid "m" obtained in the second filter 10 is introduced to the ion-exchange resin 8. That is, in this embodiment, the impurities "i" are removed from the extracted liquid "h" obtained in the first filter 7 and the extracted liquid "m" obtained in the second filter 10 with the ion-exchange resin 8 to form the boron solution "j" to be supplied to the mixing tank 9.

On the other hand, the extracted solid "n" obtained in the second filter 10 is introduced to a vacuum dryer 11 serving as recovery means. In the vacuum drier 11, moisture contained in the extracted solid "n" is removed by drying to form a powdery recycle feed "o", and the recycle feed "o" is supplied to the glass melting furnace 1 together with the glass raw material "a". In this case, the extracted solid "n" to be subjected to vacuum drying is an undissolved substance containing boron in the extracted solid-containing solution "l" as described above. Therefore, when moisture is removed from the extracted solid "n" by drying, boron whose content of impurities is small can be recovered. Boron is generally recovered as boric acid. Further, calcium may be recovered simultaneously with boron. On the other hand, the impurities "i" in the emission gas "b" are successively discharged out of a system with the ion-exchange resin 8. Therefore, even when recycling is repeated, the impurities "i" can be prevented without fail from being contained in the recycle feed "o" in a concentrated state.

The recovery means is not limited to the vacuum dryer 11, and in this embodiment, the recovery means is not particularly limited as long as it is means capable for removing moisture from a solid by drying. For example, the recovery means may also be a rotary dryer or a band dryer.

Next, the operation of the glass melting facility in which the emission gas treatment apparatus configured as described above is incorporated is described.

First, the glass raw material "a" is supplied into the glass melting furnace 1 to produce molten glass. From the emission gas "b" generated at this time, a component containing boron is collected as the collected liquid "c" by the spray tower 3 and the wet-type electric dust collector 4, and the purified emission gas "d" is released to the atmosphere from the chimney pipe 5.

The collected liquid "c" is neutralized in the neutralization tank 6 and separated into a solid and a liquid by the first filter 7. The extracted liquid "h" obtained through separation into a solid and a liquid is introduced to the ion-exchange resin 8 and has the impurities "i" removed therefrom to form the boron solution "j". Then, the boron solution "j" is introduced to the mixing tank 9. The impurities "i" removed with the ion-exchange resin 8 are released out of the system.

On the other hand, the extracted solid "k" obtained through separation into a solid and a liquid is introduced to the mixing tank 9 together with the boron solution "j". In the mixing tank 9, the extracted solid "k" and the boron solution "j" are mixed, and the extracted solid-containing solution "l" is formed. In the extracted solid-containing solution "l", boron in the extracted solid "k" remains as an undissolved substance, and impurities other than boron in the extracted solid "k" are dissolved.

The extracted solid-containing solution "l" exhibiting such a dissolved state is separated into a solid and a liquid by the second filter 10. The extracted liquid "m" obtained through separation into a solid and a liquid is introduced to the ion-exchange resin 8 to be a material for the boron solution "j".

On the other hand, the extracted solid "n" obtained through separation into a solid and a liquid has moisture removed by drying with the vacuum dryer 11 to form the recycle feed "o" containing boron whose content of impurities is small.

Note that, in the case of forming a recycle feed by the method of Patent Literature 1, the impurities in the recycle feed contain, for example, about 2,000 ppm of a hydrosulfate and about 50,000 ppm of a halide, whereas in the case of forming a recycle feed by the configuration of the first embodiment, the amounts of a hydrosulfate and a halide in the impurities of the recycle feed can be greatly reduced to about 100 ppm and 100 ppm, respectively.

Second Embodiment

Figure 2:
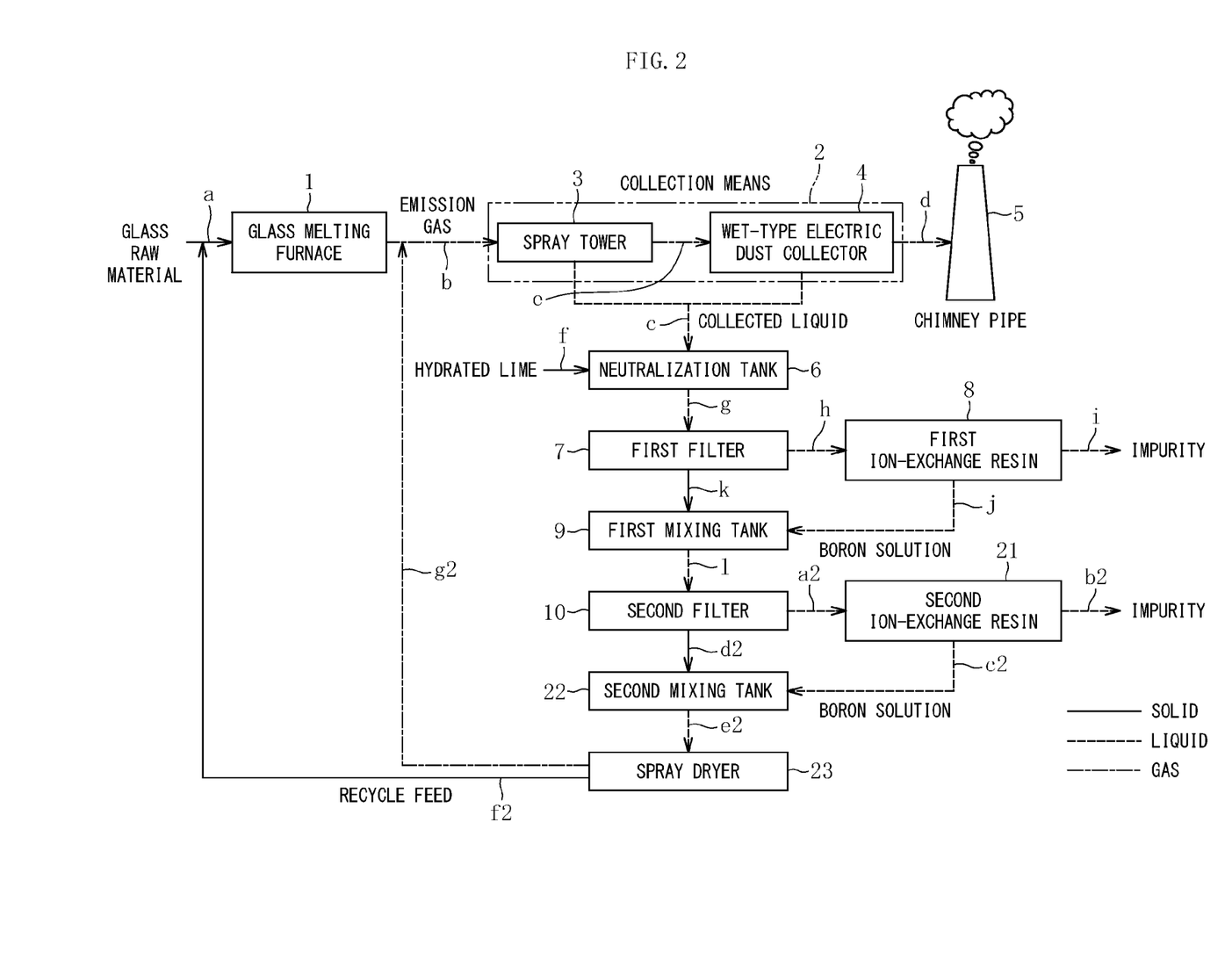
FIG. 2 is a diagram illustrating a glass melting facility in which a emission gas treatment apparatus according to a second embodiment of the present invention is incorporated.

FIG. 2 is a diagram illustrating a glass melting facility in which a emission gas treatment apparatus according to a second embodiment of the present invention is incorporated. The second embodiment is different from the first embodiment in a drying method in a recovery step for obtaining a recycle feed. Note that, like elements are denoted with like reference symbols, and the detailed description thereof is omitted.

That is, the second embodiment is different from the first embodiment in that a recycle feed is formed from a solid in the first embodiment, while a recycle feed is formed from a liquid in the second embodiment. Note that, the procedure up to the second filter 10 in FIG. 2 is the same as that of the first embodiment, and hence the subsequent steps are described.

That is, the extracted solid-containing solution "l" obtained in the first mixing tank (corresponding to the mixing tank of the first embodiment) 9 is separated into a solid and a liquid by the second filter 10, and an extracted liquid "a2" is introduced to a second ion-exchange resin 21. In the second ion-exchange resin 21, impurities "b2" are removed from the extracted liquid "a2" to form a boron solution "c2", and the boron solution "c2" is introduced to a second mixing tank 22.

On the other hand, an extracted solid "d2" obtained in the second dryer 10 is introduced to the second mixing tank 22 together with the boron solution "c2". In the second mixing tank 22, the extracted solid "d2" and the boron solution "c2" are mixed to form an extracted solid-containing solution "e2". The extracted solid-containing solution "e2" is obtained by mixing the extracted solid "d2" which is an undissolved substance containing boron with high purity with the boron solution "c2", and hence the solution hardly contains impurities other than boron.

The extracted solid-containing solution "e2" is introduced to a spray dryer 23. In the spray dryer 23, the extracted solid-containing solution "e2" is sprayed into hot air, and moisture in the extracted solid-containing solution "e2" is removed by drying with heat of the hot air. In this case, the extracted solid-containing solution "e2" to be dried is also a liquid hardly containing components other than boron, as described above. Therefore, when moisture is removed from the extracted solid-containing solution "e2" by drying, a recycle feed "f2" containing boron whose content of impurities is small can be recovered.

Note that, gas "g2" generated by the spray dryer 23 is supplied to the spray tower 3. As the hot air to be supplied into the spray dryer 23, for example, hot air generated in the glass melting furnace 1 is used. Further, a drum dryer, a CD dryer, or the like can be used instead of the spray dryer 23.

Even in the case of forming a recycle feed by the configuration of the second embodiment, the amounts of a hydrosulfate and a halide in the impurities of the recycle feed can be suppressed to about 100 ppm and about 100 ppm, respectively.

Third Embodiment

Figure 3:
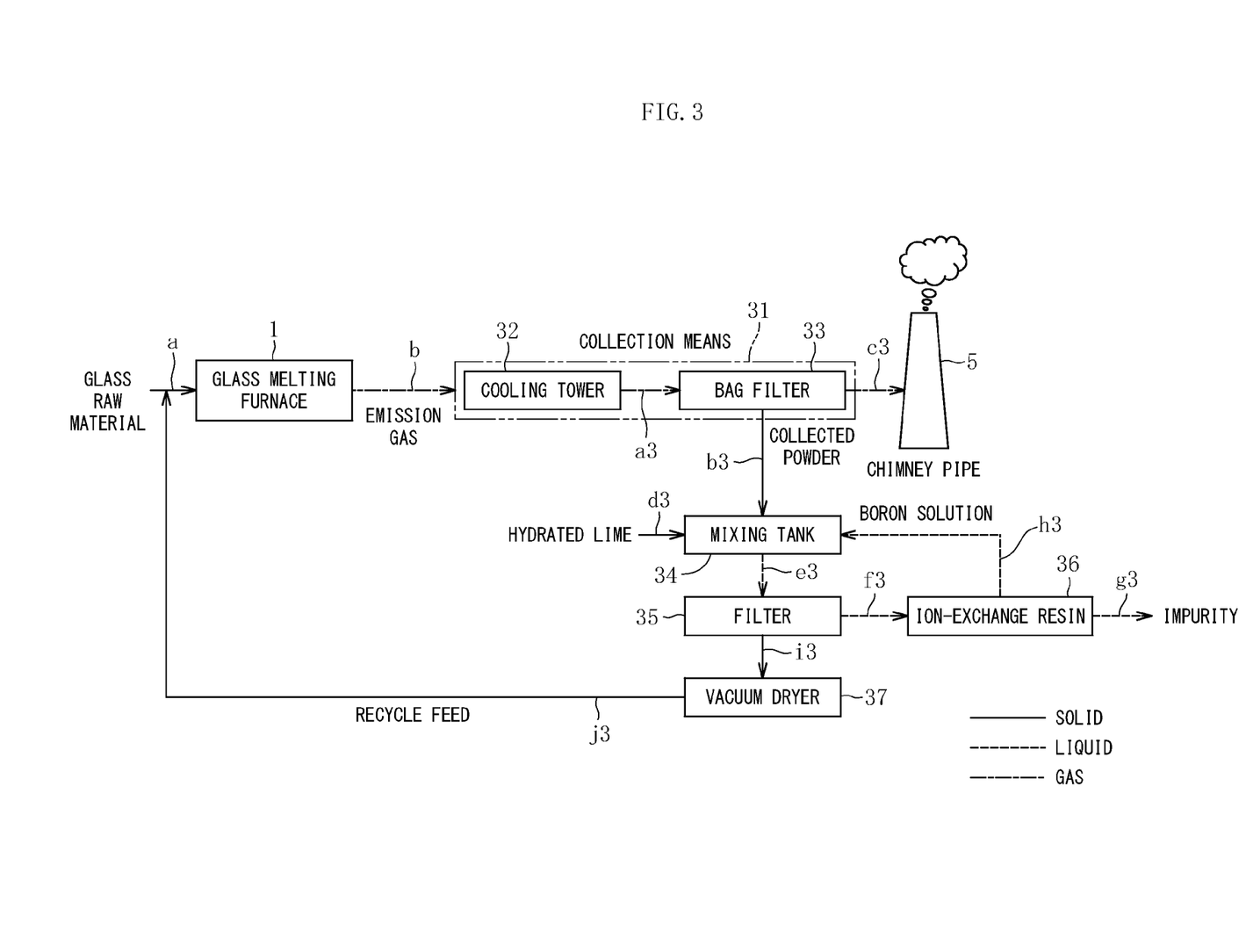
FIG. 3 is a diagram illustrating a glass melting facility in which a emission gas treatment apparatus according to a third embodiment of the present invention is incorporated.

FIG. 3 is a diagram illustrating a glass melting facility in which a emission gas treatment apparatus according to a third embodiment of the present invention is incorporated. The third embodiment is different from the first and second embodiments in that a component containing boron is collected from emission gas by a dry process. Note that, like elements are denoted with like reference symbols, and the detailed description thereof is omitted.

That is, in this embodiment, collection means 31 comprises a cooling tower 32 and a bag filter 33. The emission gas "b" is cooled by being brought into contact with wind (air) of the cooling tower 32, and the cooled emission gas "a3" is introduced to the bag filter 33. In the bag filter 33, solid components (a small-sized solid and a gaseous substance crystallized by being cooled) in the cooled emission gas "a3" are collected as collected powder "b3". The purified emission gas "c3" having passed through the bag filter 33 is released to the atmosphere from the chimney pipe 5. Note that, a dry-type electric dust collector may be used instead of the bag filter 33.

The collected powder "b3" is introduced to a mixing tank 34. In the mixing tank 34, the collected powder "b3" and a solution are mixed to form a collected powder-containing solution "e3". Further, an alkali component made of hydrated lime "d3" or the like is added to the mixing tank 34, and thus the collected powder-containing solution "e3" is subjected to neutralization treatment. Note that, as the solution, water or a boron solution supplied from outside is used only at the beginning (in the initial period) of an operation. Further, the neutralization treatment may be omitted.

The collected powder-containing solution "e3" obtained in the mixing tank 34 is introduced to a filter 35. In the filter 35, the collected powder-containing solution "e3" is separated into a solid and a liquid.

An extracted liquid "f3" obtained in the filter 35 is introduced to an ion-exchange resin 36. In the ion-exchange resin 36, impurities "g3" are removed from the extracted liquid "f3" to form a boron solution "h3". The boron solution "h3" is returned as the solution of the mixing tank 34. After the boron solution "h3" is supplied to the mixing tank 34, boron in the collected powder "b3" remains as an undissolved substance in the collected powder-containing solution "e3", and impurities in the collected powder "b3" are dissolved therein for the reason described in the first embodiment.

On the other hand, an extracted solid "i3" obtained in the filter 35 is introduced to a vacuum dryer 37. The extracted solid "i3" to be dried is an undissolved substance containing boron with high purity. Therefore, when moisture contained in the extracted solid "i3" is removed by drying in the vacuum dryer 35, boron whose content of impurities is small can be recovered as a recycle feed "j3".

Even in the case of forming a recycle feed by the configuration of the third embodiment, the amounts of a hydrosulfate and a halide in the impurities of the recycle feed can be suppressed to about 100 ppm and 100 ppm, respectively.

REFERENCE SIGNS LIST 1 glass melting furnace
2 collection means
3 spray tower
4 wet-type electric dust collector
5 chimney pipe
6 neutralization tank
7 first filter
8 ion-exchange resin
9 mixing tank
10 second filter
11 vacuum dryer

The invention claimed is:

1. A emission gas treatment method for recovering a recycle feed containing boron from emission gas discharged by a glass melting furnace for melting a boron-containing glass raw material, the emission gas treatment method comprising:
   a collection step of obtaining a collected liquid by collecting a component containing boron from the emission gas by a wet process;
   a first separation step of separating the collected liquid into a solid and a liquid;
   a solution formation step of obtaining a boron solution by removing an impurity from an extracted liquid obtained in the first separation step;
   a mixing step of obtaining an extracted solid-containing solution by mixing an extracted solid obtained in the first separation step in the boron solution;
   a second separation step of separating the extracted solid-containing solution into a solid and a liquid; and
   a recovery step of recovering the recycle feed from an extracted solid obtained in the second separation step.

2. The emission gas treatment method according to claim 1, wherein the solution formation step comprises removing the impurity from the extracted liquid through use of an ion-exchange resin.

3. The emission gas treatment method according to claim 1, wherein the first separation step and the second separation step comprise performing solid-liquid separation by filtration.

4. The emission gas treatment method according to claim 1, further comprising supplying an extracted liquid obtained in the second separation step to the solution formation step,
   wherein the solution formation step comprises obtaining the boron solution by removing an impurity from the extracted liquid obtained in the first separation step and from the extracted liquid obtained in the second separation step, and
   wherein the recovery step comprises recovering the recycle feed by drying the extracted solid obtained in the second separation step.

5. The emission gas treatment method according to claim 1, further comprising:
   a second solution formation step of obtaining a boron solution by removing an impurity from an extracted liquid obtained in the second separation step; and
   a second mixing step of obtaining an extracted solid-containing solution by mixing the extracted solid obtained in the second separation step in the boron solution obtained in the second solution formation step, wherein the recovery step comprises recovering the recycle feed by drying the extracted solid-containing solution obtained in the second mixing step.

6. A emission gas treatment apparatus for recovering a recycle feed containing boron from emission gas discharged by a glass melting furnace for melting a boron-containing glass raw material, the emission gas treatment apparatus comprising:

collection means for collecting a component containing boron from the emission gas by a wet process to obtain a collected liquid;

first separation means for separating the collected liquid into a solid and a liquid;

solution formation means for forming a boron solution by removing an impurity from an extracted liquid obtained in the first separation means;

a mixing tank for mixing an extracted solid obtained in the first separation means in the boron solution to form an extracted solid-containing solution;

second separation means for separating the extracted solid-containing solution into a solid and a liquid; and recovery means for recovering the recycle feed from an extracted solid obtained in the second separation means.

* * * * *